(12) United States Patent
Nayak et al.

(10) Patent No.: US 8,867,163 B2
(45) Date of Patent: *Oct. 21, 2014

(54) HEAD ROTATOR ASSEMBLY FOR TAPE DRIVE

(71) Applicant: Quantum Corporation, San Jose, CA (US)

(72) Inventors: Ashok B. Nayak, Glendora, CA (US); Turguy Goker, Solana Beach, CA (US); Ming-Chih Weng, Los Angeles, CA (US); James Mark Decot, Fountain Valley, CA (US)

(73) Assignee: Quantum Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/065,272

(22) Filed: Oct. 28, 2013

(65) Prior Publication Data

US 2014/0049855 A1 Feb. 20, 2014

Related U.S. Application Data

(63) Continuation of application No. 13/249,627, filed on Sep. 30, 2011, now Pat. No. 8,599,519.

(51) Int. Cl.
*G11B 5/027* (2006.01)
*G11B 5/584* (2006.01)
*G11B 5/56* (2006.01)
*G11B 5/53* (2006.01)

(52) U.S. Cl.
CPC ........ *G11B 5/56* (2013.01); *G11B 5/584* (2013.01); *G11B 5/53* (2013.01)
USPC .......................................................... 360/84

(58) Field of Classification Search
None
See application file for complete search history.

(56) References Cited

U.S. PATENT DOCUMENTS 7,342,738 B1 * 3/2008 Anderson et al. .......... 360/77.12
8,599,519 B2 * 12/2013 Nayak et al. ............... 360/291.4

* cited by examiner

*Primary Examiner* — Thang Tran
(74) *Attorney, Agent, or Firm* — Roeder & Broder LLP; James P. Broder (57) ABSTRACT

A head rotator assembly for positioning a head of a tape drive relative to a storage tape that moves over the head comprises a head supporter and a supporter mover assembly. The head supporter is coupled to and supports the head. The supporter mover assembly includes a first actuator that indirectly rotates a portion of the head supporter about an axis to move the head in an azimuth direction relative to the storage tape as the storage tape moves over the head. The supporter mover assembly can further include a first lever. The first actuator moves the first lever to rotate the portion of the head supporter so that the head moves in the azimuth direction relative to the storage tape.

18 Claims, 6 Drawing Sheets

HEAD ROTATOR ASSEMBLY FOR TAPE DRIVE

RELATED APPLICATION

The present application is a continuation application and claims the benefit under 35 U.S.C. 120 on co-pending U.S. patent application Ser. No. 13/249,627, filed on Sep. 30, 2011. To the extent permitted, the contents of U.S. patent application Ser. No. 13/249,627 are incorporated herein by reference.

BACKGROUND

Linear tape drive systems provide for high-density recording on multiple tracks of a magnetic storage tape (the "tape"). In certain arrangements, parallel tracks extend along a longitudinal direction of the tape. During recording or playback, the read/write elements of the head should be aligned with the desired track as the tape moves in a longitudinal direction across the head. Closed loop positioners are often used in tape systems having higher track densities. In high-density tape systems, the tape may wander in the lateral direction (perpendicular to the longitudinal direction) as it moves in the longitudinal direction across the head, which can result in a positioning error or offset between the head and a center line of the desired track, also known as track misregistration (TMR). This type of off-track condition can be caused by a number of factors including tape dimensional stability (TDS) and/or dynamic tape skew. TDS is normally caused by changes in the operational temperature and/or relative humidity within the tape drive, which can cause changes the width of the tape. The ranges of temperature and humidity in the tape drive are fairly broad, i.e. temperatures of approximately 50-104° F., and relative humidity of approximately 10-80%. Thus, the dimensions of the tape changes as temperature and/or humidity vary within these ranges.

Tape cartridges for high-density tape drives are typically preformatted with information often called servo information, which is used to maintain the correct lateral position of the tape with respect to the head. Servo information provides the system with feedback to determine the continuous position of the tape relative to the head. Analysis of the servo signals allows for a determination of an offset and the distance of the offset between the track and the head. Based on the information, the head is moved by a positioner in the lateral direction to the center line of the track so that write/read operations can occur properly.

Linear Tape Open ("LTO") is a computer storage magnetic tape format that employs a servo-based, closed loop control mechanism. The LTO roadmap calls for successive increases in capacity and speed, requiring increased track densities. As track densities increase with each new generation of LTO tape cartridges, the ability to precisely control the read/write head relative to the magnetic tape becomes increasingly important and more difficult, particularly due to phenomena such as tape dimensional stability and dynamic tape skew. These phenomena can cause not only lateral tape offset, but offset in other directions, such as an azimuth direction, particularly with such high track densities used in today's tape cartridges.

SUMMARY

The present invention is directed toward a head rotator assembly for positioning a head of a tape drive relative to a storage tape that moves over the head. In certain embodiments, the head rotator assembly includes a head supporter and a supporter mover assembly. The head supporter is coupled to and supports the head. The supporter mover assembly includes a first actuator tht indirectly rotates a portion of the head supporter about an axis to move the head in an azimuth direction relative to the storage tape as the storage tape moves over the head.

In some embodiments, the supporter mover assembly further includes a first lever. In such embodiments, the first actuator moves the first lever to rotate the portion of the head supporter so that the head moves in the azimuth direction relative to the storage tape. The first actuator can include a piezoelectric element. In one such embodiment, the first actuator exerts a force against the first lever to rotate the first lever about a lever pivot in a first rotational direction. Upon the rotation of the first lever in the first rotational direction, the first lever exerts a force against the head supporter to rotate the head supporter about a supporter pivot in a second rotational direction that is different than the first rotational direction. In another embodiment, the first actuator exerts a force against the first lever to flex the first lever. In such embodiment, upon the flexing of the first lever, the first lever exerts a force against the head supporter to rotate the head supporter about a supporter pivot to move the head in the azimuth direction relative to the storage tape. Additionally, in one embodiment, the first actuator imparts an actuator bias force against the first lever in a first direction, and the first lever imparts a lever bias force against the head supporter in a second direction that is different than the first direction. Further, the first direction can be approximately perpendicular to the second direction.

In accordance with one embodiment, the head rotator assembly further includes a controller that receives a positioning signal from the head. The controller controls movement of the supporter mover assembly based at least partially on the positioning signal.

In some embodiments, the supporter mover assembly further includes a second actuator that indirectly rotates the portion of the head supporter about the axis to move the head in the azimuth direction relative to the storage tape. In one such embodiment, the supporter mover assembly further includes a second lever. The second actuator moves the second lever to rotate the portion of the head supporter so that the head moves in the azimuth direction relative to the storage tape. Additionally, the second actuator can be on an opposite side of the head supporter from the first actuator.

In one embodiment, the supporter mover assembly further comprises a support plate. In such embodiment, the head supporter can be at least partially fixedly secured to the support plate.

The present invention is further directed toward a tape drive including a head and the head rotator assembly as described above that supports the head.

In another application, the present invention is also directed toward a method for positioning a head of a tape drive relative to a storage tape that moves over the head, the method comprising the steps of (i) supporting the head with a head supporter that is coupled to the head; and (ii) indirectly rotating a portion of the head supporter about an axis with a first actuator to move the head in an azimuth direction relative to the storage tape as the storage tape moves over the head.

In addition to the aspects and embodiments described above, further aspects and embodiments will become apparent by reference to the drawings and by study of the following description.

BRIEF DESCRIPTION OF THE DRAWINGS

The invention, together with further advantages thereof, may best be understood by reference to the following description taken in conjunction with the accompanying drawings, taken in conjunction with the accompanying description, in which similar reference characters refer to similar parts, and in which.

DESCRIPTION

Embodiments of the present invention are described herein in the context of a system and method for tape drive control. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
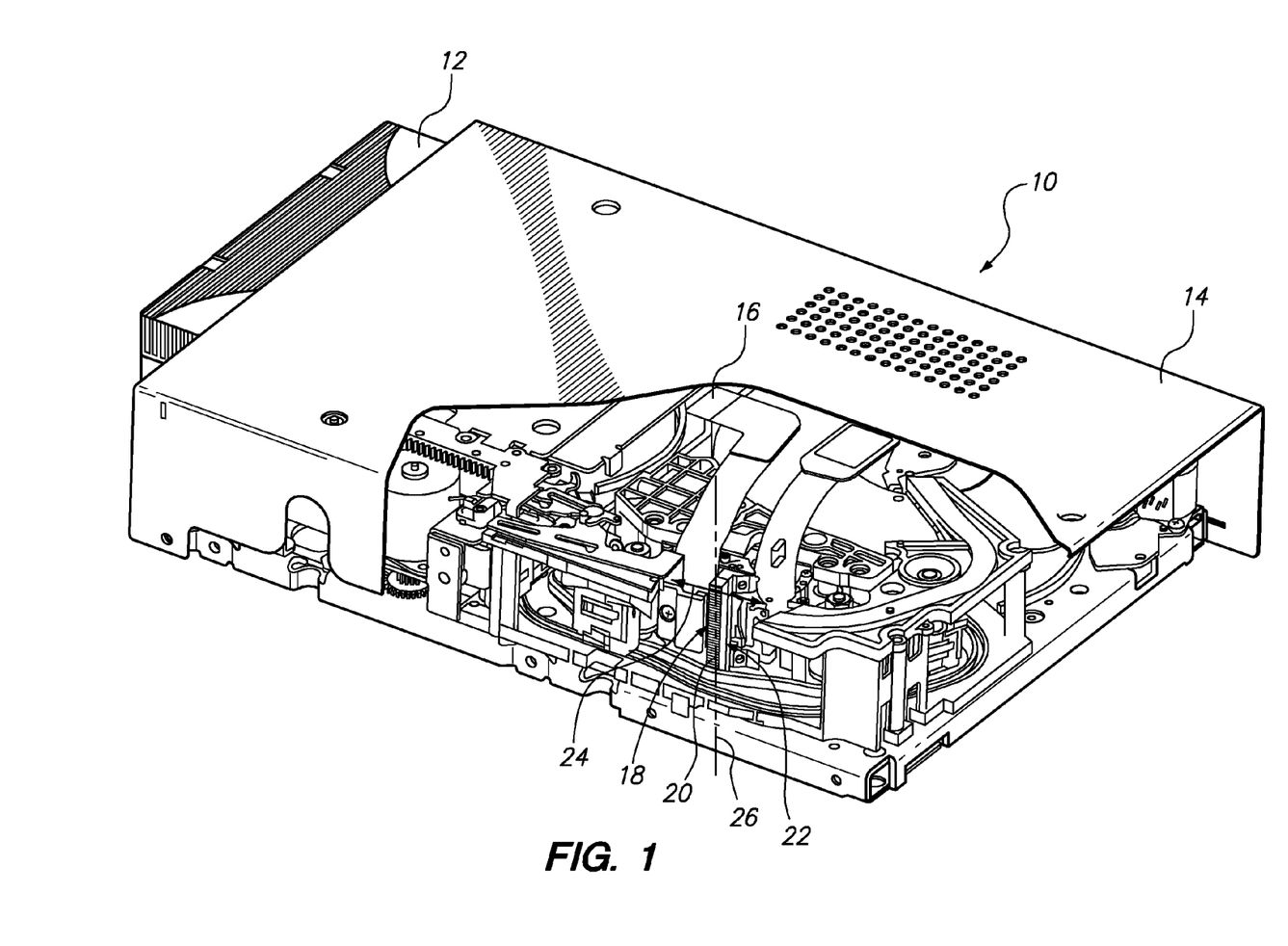
FIG. 1 is a perspective view of a tape cartridge and a partially cutaway view of a tape drive including one embodiment of a head assembly having features of the present invention.

FIG. 1 depicts a perspective view of one embodiment of a media drive 10 (also sometimes referred to herein as a "drive") constructed in accordance with embodiments of the present invention, and a media cartridge 12 (sometimes referred to herein as a "cartridge"), which is shown at least partially inserted within the drive 10 in FIG. 1. The cartridge 12, such as an LTO tape cartridge as one non-exclusive example, is insertable at one end of the tape drive 10. The cartridge 12 includes a storage tape (not shown) that stores data.

As one non-exclusive example, the drive 10 can be a tape drive. The design of the drive 10 can vary. In some embodiments, the drive 10 includes a housing 14, a controller 16 and a head assembly 18. The head assembly 18 includes a head 20 and a head rotator assembly 22. The storage tape bidirectionally moves across or over the head 20 in a back-and-forth direction (illustrated by bidirectional arrow 24) that is substantially perpendicular to a lateral axis (illustrated by dashed line 26) of the head 20.

Figure 2A:
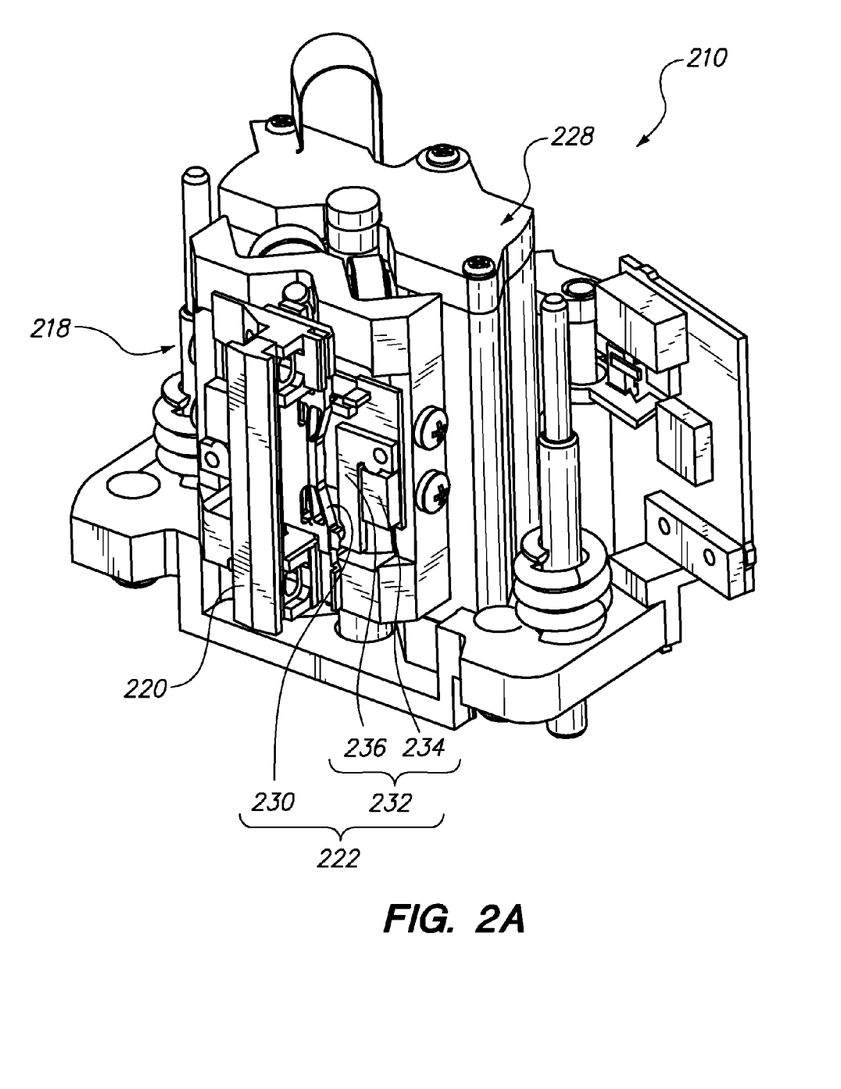
FIG. 2A is a front perspective view of one embodiment of the head assembly including a head rotator assembly.

The specific design and location of the controller 16 can vary depending upon the requirements of the drive 10 and/or the head rotator assembly 22. In various embodiments, the controller 16 controls movement of the head rotator assembly 22 and/or other types of head movers 228 (one head mover 228 is illustrated in FIG. 2A), such as voice coil motors, linear motors, piezoelectric elements or other suitable head movers. The head rotator assembly 22 and/or the other head mover(s) 228 in turn move the head 20 in one or more directions (i.e. rotation about one or more axes and/or linear movement along one or more axes) based at least in part on a positioning signal received from the head 20. This positioning signal is generated by the head 20 based on servo information located on the storage tape.

In one embodiment, the head 20 transmits the positioning signal to the controller 16 to cause movement of the head rotator assembly 22 and/or the other head movers. As a result, the head 20 is moved relative to the storage tape, thereby attaining or maintaining the correct lateral, longitudinal, zenith and/or azimuth position of the head 20 with respect to the storage tape. This type of closed-loop system provides continuous feedback to the controller 16 to determine and/or correct the position of the head 20 relative to the storage tape.

FIG. 2A is a front perspective view of a portion of a tape drive 210 including one embodiment of a head assembly 218. The head assembly 218 includes a head 220 and a head rotator assembly 222. The head rotator assembly 222 rotates or otherwise moves the head 220 in the azimuth direction relative to the storage tape. The design of the head rotator assembly 222 can vary to suit the design requirements of the drive 210. In the embodiment illustrated in FIG. 2A, the head rotator assembly 222 includes a head supporter 230 and a supporter mover assembly 232. The head supporter 230 supports the head 220. The supporter mover assembly 232 moves the head supporter 230. More specifically, the supporter mover assembly 232 causes rotation of the head supporter 230, which in turn rotates the head 220 in the azimuth direction relative to the storage tape, as described in greater detail below.

Figure 2B:
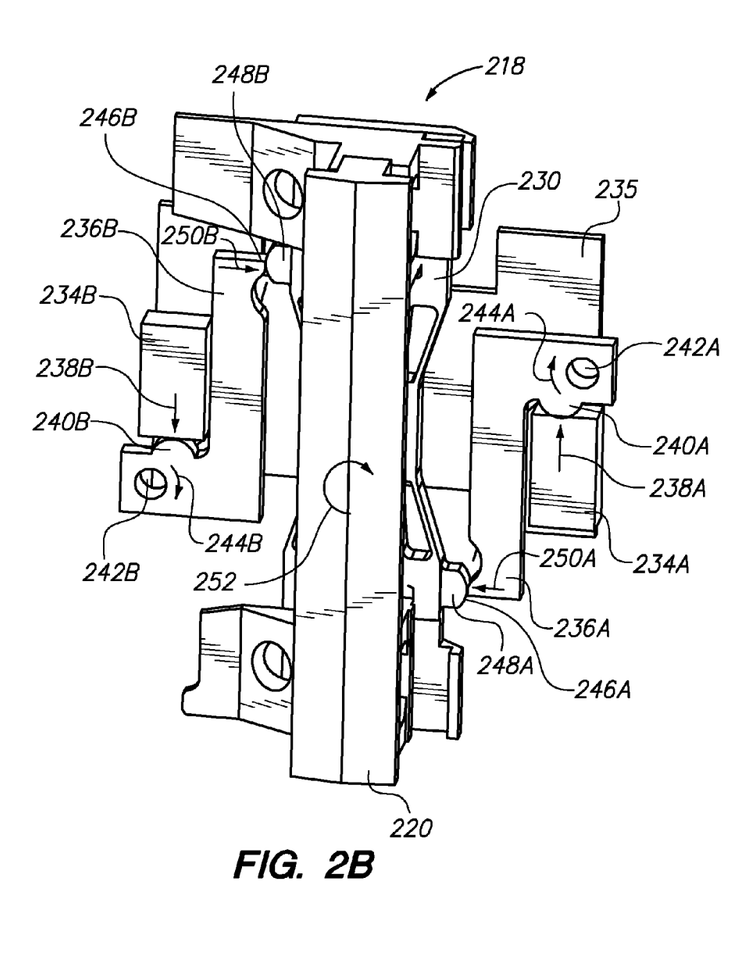
FIG. 2B is a front perspective view of a portion of the head assembly illustrated in FIG. 2A including the head rotator assembly having a head supporter.

FIG. 2B is a front perspective view of a portion of the head assembly 218 illustrated in FIG. 2A including the head 220 and the head rotator assembly 222. In this embodiment, the head rotator assembly 222 includes the head supporter 230 and the supporter mover assembly 232 which moves the head supporter 230. In one embodiment, the supporter mover assembly 232 includes one or more actuators and one or more levers. For example, in the embodiment illustrated in FIG. 2B, the supporter mover assembly 232 includes a first actuator 234A, a second actuator 234B, a support plate 235, a first lever 236A and a second lever 236B.

In one embodiment, the first actuator 234A and/or the second actuator 234B can include one or more piezoelectric elements or a piezoelectric element stack, for example. For example, in one embodiment, the first actuator 234A and/or the second actuator 234B can include a 4 mm piezoelectric stack. Alternatively, other size and/or types of piezoelectric elements can be used. Still alternatively, other suitable types of actuators can be utilized. In various embodiments, one portion of each of the first actuator 234A and the second actuator 234B is fixedly mounted to the support plate 235 so that another portion of each corresponding actuator 234A, 234B is movable. Upon receiving electrical voltage, the movable portion of the first actuator 234A and the second actuator 234B can exert a first actuator bias force (illustrated by arrow 238A) and/or a second actuator bias force (illustrated by arrow 238B), upon the first lever 236A and/or the second lever 236B, respectively, as illustrated in FIG. 2B, resulting in movement of the levers 236A, 236B.

The support plate 235 supports the head rotator assembly 222. In one embodiment, the support plate 235 can be secured to another portion of the head assembly 218 such as to one or more of the head movers 228 (illustrated in FIG. 2A), as one non-exclusive embodiment. In certain embodiments, the head supporter 230 of the head rotator assembly 222 can be fixedly secured to the support plate 235 at a supporter pivot 239 (illustrated in FIG. 2C) which is located substantially at or near a supporter pivot axis 241 (illustrated by dashed line in FIG. 2C) of the head supporter 230. In one embodiment, the supporter pivot axis 241 is located near the center of the head supporter 230. Alternatively, the supporter pivot axis 241 can be located off-center.

In the embodiment illustrated in FIG. 2B, the first lever 236A includes a first actuator contact 240A and a first lever pivot 242A. The second lever 236B includes a second actuator contact 240B and a second lever pivot 242B. The first actuator contact 240A contacts the first actuator 234A, and the second actuator contact 240B contacts the second actuator 234B. In one embodiment, the lever pivots 242A, 242B are each pivotally secured to the support plate 235 in a manner known to those skilled in the art, such as by a bearing and a pin forming a pivot construction, as one non-exclusive example. Alternatively, the one or more of the lever pivots 242A, 242B can be pivotally secured to another suitable structure within the drive 10. In various embodiments, the levers 236A, 236B can be formed from any suitably rigid material such as stainless steel, aluminum, etc., as non-exclusive examples. In one embodiment, the levers 236A, 236B are somewhat L-shaped. However, the levers 236A, 236B can have another suitable configuration.

Upon exertion or increase of the first actuator bias force 238A by the first actuator 234A against the first actuator contact 240A of the first lever 236A, the first lever 236A pivots or rotates about the first lever pivot 242A in a clockwise direction (illustrated by rotational arrow 244A) as viewed in FIG. 2B. Somewhat similarly, upon exertion or increase of the second actuator bias force 238B by the second actuator 234B against the second actuator contact 240B, the second lever 236B pivots or rotates about the second lever pivot 242B in a clockwise direction (illustrated by rotational arrow 244B) as viewed in FIG. 2B.

Additionally, in this embodiment, each lever 236A, 236B includes a corresponding supporter contact. More specifically, the first lever 236A includes a first supporter contact 246A, and the second lever 236B includes a second supporter contact 246B. Further, the head supporter 230 includes a first lever contact 248A and a second lever contact 248B. The first supporter contact 246A contacts the first lever contact 248A of the head supporter 230. The second supporter contact 246B contacts the second lever contact 248B of the head supporter 230. Upon rotation of the levers 236A, 236B about their respective lever pivots 242A, 242B, the first supporter contact 246A exerts a first lever bias force (illustrated by arrow 250A) against the first lever contact 248A, and the second supporter contact 246B exerts a second lever bias force (illustrated by arrow 250B) against the first lever contact 248B. These bias forces 250A, 250B result in movement of the head supporter 230 as described herein.

In the embodiment illustrated in FIG. 2B, the combination of bias forces 250A, 250B against the head supporter 230 causes rotation of the head supporter 230, as described in greater detail below. This rotation of the head supporter 230 results in rotation of the head 220 in an azimuth direction (illustrated by arrow 252) relative to a storage tape that moves over the head 220 during operation of the tape drive 10. It is recognized that both bias forces 250A, 250B are not necessary to result in rotation of the head 220 in an azimuth direction. However, embodiments that utilize two or more such bias forces 250A, 250B can result in more even movement, better balance, increased accuracy and/or greater responsiveness of the head rotator assembly 222.

In various embodiments, the first actuator bias force 238A between the first actuator 234A and the first lever 236A is in a first direction, and first lever bias force 250A between the first lever 236A and the head supporter 230 is in a second direction that is different than the first direction. In one embodiment, the first actuator bias force 238A between the first actuator 234A and the first lever 236A is in a first direction, and first lever bias force 250A between the first lever 236A and the head supporter 230 is in a second direction that is approximately perpendicular to the first direction.

Conversely, if voltage to the actuators 234A, 234B is decreased, the movable portion of the first actuator 234A and the second actuator 234B can contract, thereby decreasing the first actuator bias force 238A and/or the second actuator bias force 238B, upon the first lever 236A and/or the second lever 236B, respectively. Upon decrease of the first actuator bias force 238A by the first actuator 234A against the first actuator contact 240A, the first lever 236A pivots or rotates about the first lever pivot 242A in a counterclockwise direction (opposite of rotational arrow 244A). Somewhat similarly, upon decrease of the second actuator bias force 238B by the second actuator 234B against the second actuator contact 240B, the second lever 236B pivots or rotates about the second lever pivot 242B in a counterclockwise direction (opposite of rotational arrow 244B). Upon such opposite rotation of the levers 236A, 236B about their respective lever pivots 242A, 242B, the first lever bias force 250A of the first supporter contact 246A against the first lever contact 248A decreases, and the second lever bias force 250B of the second supporter contact 246B against the first lever contact 248B likewise decreases. The net result of these decreases in lever bias forces 250A, 250B results in rotation of the head supporter in an opposite direction from that illustrated in FIG. 2B, thereby causing the head 220 to rotate in an azimuth direction opposite of that illustrated by rotational arrow 252.

In operation, in one embodiment, the first actuator 234A and/or the second actuator 234B are under closed loop servo control and can periodically and/or continuously receive electrical voltage from the controller 16 (illustrated in FIG. 1). For example, at various sample times, i.e. one time per millisecond (or any other suitable increment of time, or varying increments of time), the tape drive 10 can detect a required adjustment in the azimuth angle of the head 220 relative to the storage tape, and can send a control input (voltage) to the actuators 234A, 234B to ultimately move the head 220 to a target azimuth angle. The range of movement of the head 220 can vary depending upon the geometry of the actuators 234A, 234B, the levers 236A, 236B and the head supporter 230, as well as the positioning and dimensions of other components within the drive 10. In one non-exclusive embodiment, movement of the head supporter 230 by approximately 6 microns can result in movement of the head 220 by approximately 4 arc minutes of rotation.

Altering the positioning of the various components described herein can result in tuning of the head rotator assembly 222. As one non-exclusive example, the positioning of the lever pivots 242A, 242B relative to the actuator contacts 240A, 240B can alter the degree of rotation of the levers 236A, 236B. Further, the dimensions of the levers 236A, 236B can influence the extent of the forces that are ultimately transferred and/or translated from the actuators 234A, 234B to the head supporter 230, as recognized by those skilled in the art. The foregoing examples are only representative of the changes in either or both of positioning and/or dimensions of various structures that comprise the head rotator assembly 222 and/or other structures of the tape drive 10, and are not intended to be limiting in any way.

Figure 2C:
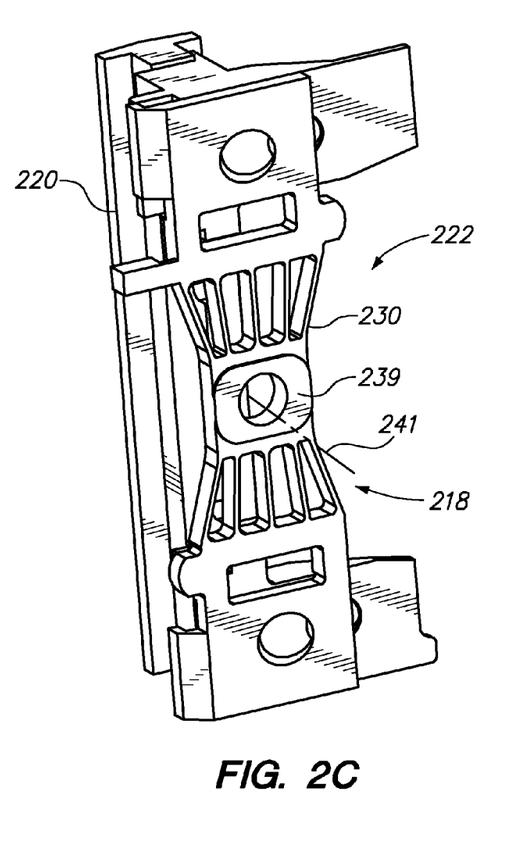
FIG. 2C is a rear perspective view of a portion of the head assembly illustrated in FIG. 2A including a portion of the head rotator assembly.

FIG. 2C is a rear perspective view of a portion of the head assembly 218 illustrated in FIG. 2A including the head 220 and a portion of the head rotator assembly 222. In this embodiment, the supporter pivot 239, which can be attached to the support plate 235 (illustrated in FIG. 2B), is visible. In one embodiment, the supporter pivot 239 of the head supporter 230 is fixedly attached to the support plate 235, while the remainder of the head supporter 230 is unattached to the support plate 235. This configuration allows for rotation of at least a portion of the head supporter 230 about the supporter pivot axis 241 of the supporter pivot 239.

Figure 2D:
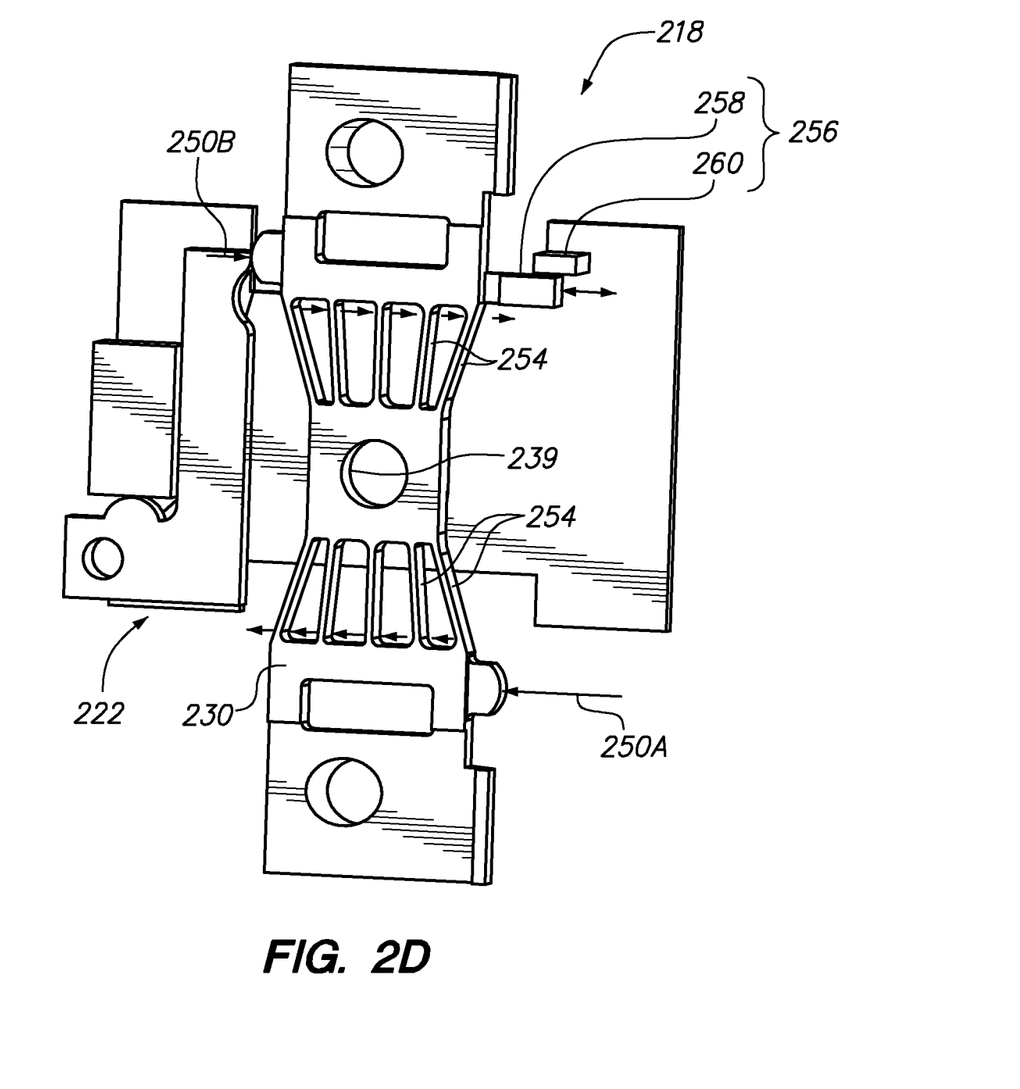
FIG. 2D is a front perspective view of a portion of the head assembly illustrated in FIG. 2A including a portion of the head rotator assembly.

FIG. 2D is a front perspective view of a portion of the head assembly 218 illustrated in FIG. 2A including a portion of the head rotator assembly 222. In certain embodiments, the head supporter 230 includes one or more support arms 254 (10 support arms are illustrated in FIG. 2D, although only 4 support arms are labeled) that span approximately or substantially radially away from the supporter pivot 239. In this embodiment, upon exertion of the lever bias forces 250A, 250B on the head supporter 230, the support arms can flex (shown by 10 unlabeled arrows) to allow rotation of at least a portion of the head supporter 230 about the supporter pivot 239. The dimensions, i.e. thickness, length and width of the support arms 254 can be varied in order to tune the extent of rotation of the head supporter 230.

In one embodiment, the head rotator assembly can include a sensor assembly 256 for measuring the extent of rotation and/or linear movement of a portion of the head supporter 230. The sensor assembly can be varied, but in one embodiment, the sensor assembly 256 can include a Linear Hall Effect sensor 258 and a magnet 260 which cooperate to provide information to the controller 16 (illustrated in FIG. 1) for closed loop feedback. During movement of the head supporter 230, the magnet 260 and/or the Linear Hall Effect sensor 258 move relative to one another to provide input to the controller 16 on a periodic or continuous basis.

Figure 3A:
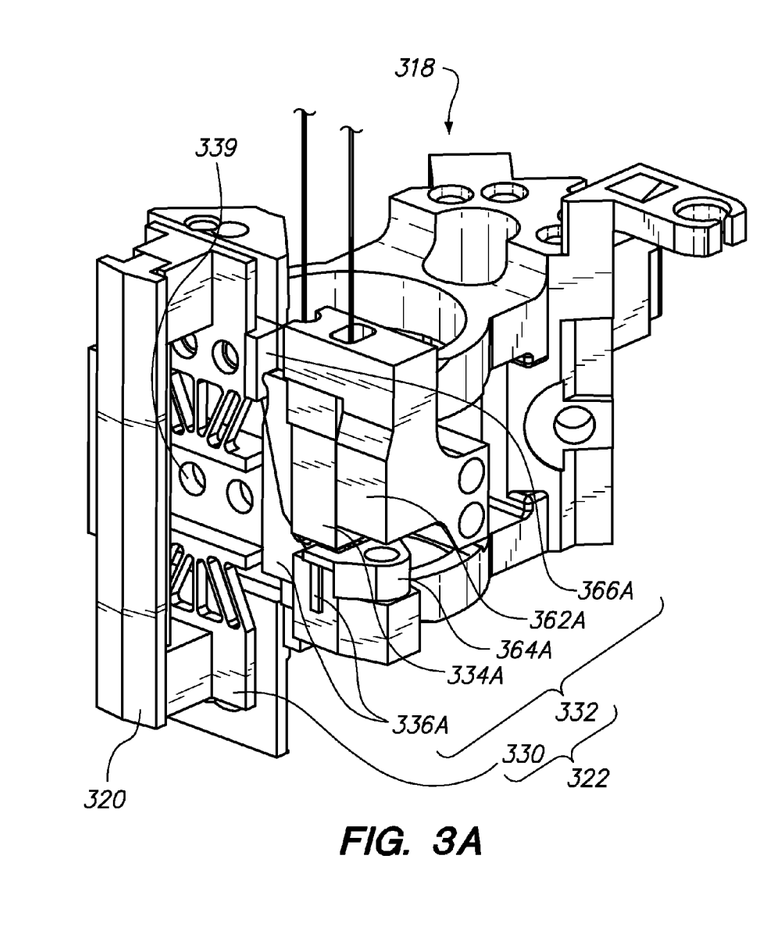
FIG. 3A is a perspective view of a portion of another embodiment of the head assembly including a head rotator assembly.

FIG. 3A is a perspective view of a portion of another embodiment of the head assembly 318, including a head 320 and a head rotator assembly 322. In this embodiment, the head rotator assembly 322 operates in a somewhat similar manner as the embodiments previously described such that the head rotator assembly 322 rotates or otherwise moves the head 320 in the azimuth direction relative to the storage tape. In the embodiment illustrated in FIG. 3A, the head rotator assembly 322 includes a head supporter 330 and a supporter mover assembly 332. The head supporter 330 supports the head 320. The supporter mover assembly 332 moves the head supporter 330. More specifically, the supporter mover assembly 332 causes rotation of the head supporter 330, which in turn rotates the head 320 in the azimuth direction relative to the storage tape.

In this embodiment, however, the supporter mover assembly 332 has a somewhat different configuration than the supporter mover assembly 232 (illustrated in FIG. 2A) previously described. More specifically, in this embodiment, the supporter mover assembly 332 includes a first actuator 334A, a first actuator support 362A, a first lever 336A, a first clamp 364A and a first lever bearing surface 366A. It should be understood that although only one side of the head rotator assembly 322 is being described herein for the sake of simplicity, in various embodiments, an opposing side (not shown) of the head rotator assembly 322 would also be present, which would include a second actuator, a second actuator support, a second lever, a second clamp and a second lever bearing surface. The components of the opposing side of the head rotator assembly 322 can be somewhat similarly positioned, albeit substantially symmetrical about a supporter pivot 339 of the head supporter 330.

In the embodiment illustrated in FIG. 3A, the first actuator 334A is partially fixedly secured to the first actuator support 362A. In one embodiment, the first actuator can be a piezoelectric element or stack which expands and/or contracts based on the level of voltage applied to the first actuator 334A. A portion of the first actuator remains unsecured to the first actuator support 362A, and extends to contact the first lever 336A. In this embodiment, the first lever 336A is secured in place with the first clamp 364A rather than with a lever pivot, as previously described. Thus, the first lever 336A does not pivot about the lever pivot, but instead flexes upon a force being exerted by the first actuator 334A, as described in greater detail below. The first lever 336A contacts the first lever bearing surface 366A, which is secured to one of the first lever 336A or the head supporter 330.

As an overview, the first actuator 334A receives voltage from the controller 16 (illustrated in FIG. 1), causing the first actuator to exert a force on the first lever 336A, thereby flexing the first lever 336A. Flexing of the first lever 336A results in the first lever 336A exerting a force on the first lever bearing surface 366A, causing the head supporter 330 to rotate about the supporter pivot 339. This rotation of the head supporter 330 causes rotation of the head 320 in the azimuth direction, as previously described herein. This embodiment is particularly effective when the first lever 336A and the second lever (not shown) are working simultaneously to more symmetrically rotate the head supporter 330 to move the head 320 in the azimuth direction as required based on servo information received by the controller 16. In this embodiment, because the first lever 336A is not secured via a pivot lever pivot, certain inefficiencies or errors due to clearance between a pin of the pivot and a bearing hole of the lever pivot can be reduced or avoided entirely.

Figure 3B:
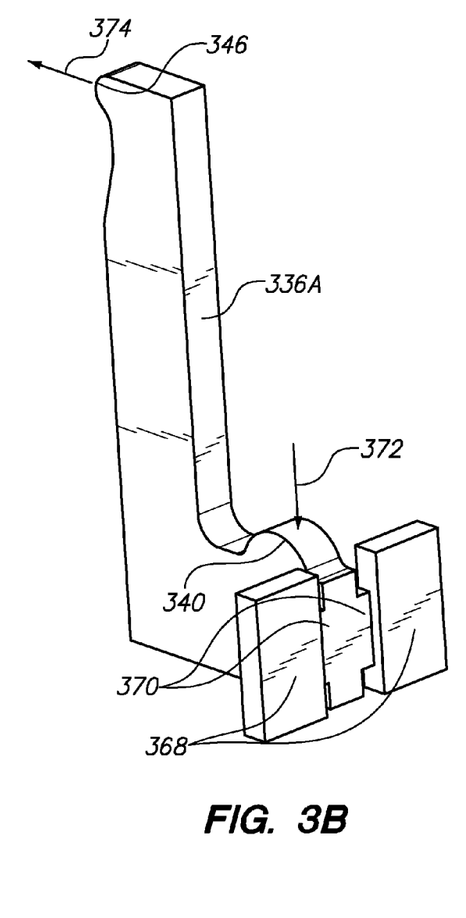
FIG. 3B is a perspective view of a portion of the head rotator assembly illustrated in FIG. 3A.

FIG. 3B is a perspective view of the first lever 336A of the head rotator assembly 322 illustrated in FIG. 3A. In this embodiment, the first lever 336A includes an actuator contact 340, a supporter contact 346, one or more clamp wings 368 (two clamp wings are shown in FIG. 3B), and one or more flex connectors 370 (two flex connectors are shown in FIG. 3B). The actuator contact 340 is a raised region of the first lever 336A that contacts the first actuator 334A (illustrated in FIG. 3A). The supporter contact 346 contacts the lever bearing surface 366A (illustrated in FIG. 3A) of the head supporter 330 (illustrated in FIG. 3A).

The clamp wings 368 can be fixedly held in position by the clamp 364A (illustrated in FIG. 3A) so that there is essentially a zero clearance and very little, if any, movement of the clamp wings 368 during movement of the remainder of the first lever 336A. The flex connectors 370 are connected to the clamp wings 368. The flex connectors 370 are flexible under a load by the first actuator 334A, thereby allowing the remainder of the first lever 336A to move while the clamp wings 368 remain substantially stationary. The flex connectors 370 can be constructed of a different, more flexible material than the clamp wings 368. Alternatively, the flex connectors 370 can be constructed of the same material as the clamp wings 368, but can have smaller dimensions which allow less restricted movement to allow the remainder of the first lever 336A to flex and move under load by the first actuator 334A.

In accordance with the embodiment illustrated in FIG. 3B, an actuator bias force imparted by the first actuator 334A (illustrated in FIG. 3A) in a first direction (represented by arrow 372) results in flexing of the flex connectors 370 and movement of the first lever 336A so that the supporter contact 346 moves in a second direction (represented by arrow 374) that is different than the first direction 372. In one embodiment, the first direction 372 is approximately perpendicular to the second direction 374.

Figure 3C:
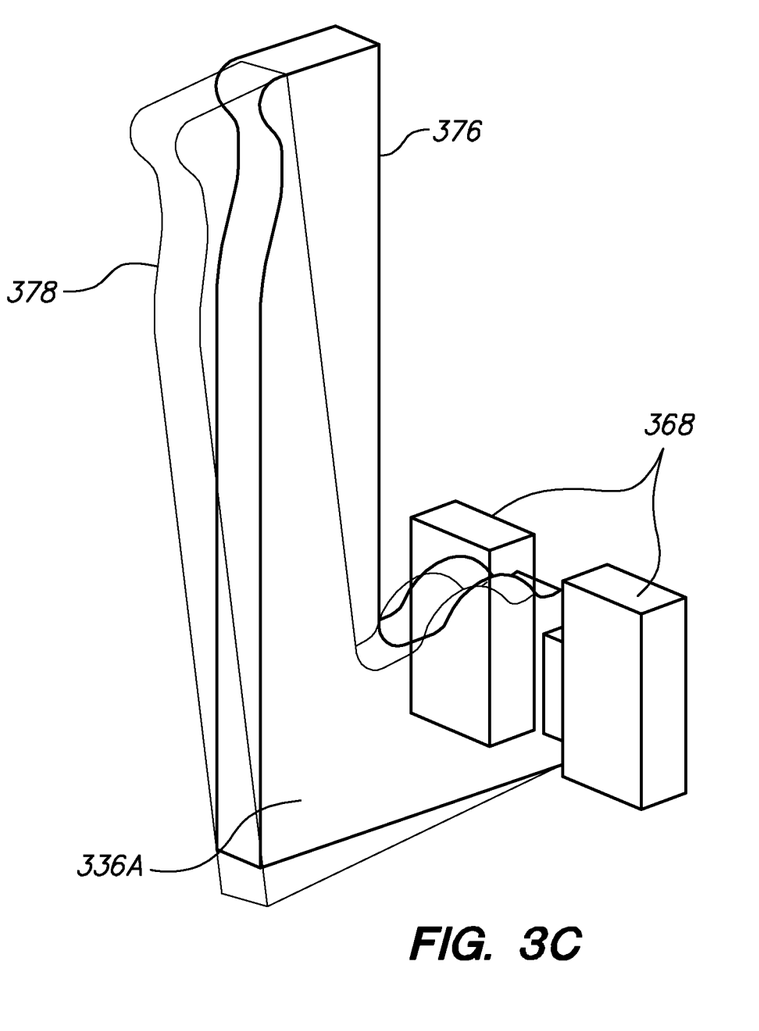
FIG. 3C is a perspective view of the portion of the head rotator assembly illustrated in FIG. 3B, shown in a first position and a second position.

FIG. 3C is a perspective view the first lever 336A of the head rotator assembly 322 illustrated in FIG. 3A, shown in a first position 376 and a second position 378 that is superimposed on the first position 376 to show movement of the first lever 336A. In the first position 376, a lesser force is being imparted by the first actuator 334A (illustrated in FIG. 3A) on the first lever 336A than when the first lever 336A is shown in the second position 378. Stated another way, an increased force by the first actuator 334A on the first lever 336A biases the first lever 336A from the first position 376 to the second position 378. Although the clamp wings 368 essentially do not move any significant amount, the remainder of the first lever 336A does move, which allows the first lever 336A to impose a lever bias force on the head supporter 330 (illustrated in FIG. 3A) as required to rotate the head 320 (illustrated in FIG. 3A) in the azimuth direction.

All of the following disclosed embodiments are used in conjunction with control logic operative to control movement of the head rotator assembly in the azimuth direction under closed loop servo control. A variety of algorithms can be used to move the head rotator assembly 22, and therefore the head 20, in the azimuth direction in response to tape dimensional stability and/or dynamic tape skew of the storage tape detected by monitoring servo signals.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A head rotator assembly for positioning a head of a tape drive relative to a storage tape that moves over the head, the head rotator assembly comprising:
   a head supporter that is coupled to and supports the head; and
   a supporter mover assembly including (i) a lever, (ii) a first actuator that moves the first lever to rotate the portion of the head supporter about an axis to move the head in an azimuth direction relative to the storage tape as the storage tape moves over the head.

2. The head rotator assembly of claim 1 wherein the first actuator exerts a force against the first lever to rotate the first lever about a lever pivot in a first rotational direction, and wherein upon the rotation of the first lever in the first rotational direction, the first lever exerts a force against the head supporter to rotate the head supporter about a supporter pivot in a second rotational direction that is different than the first rotational direction.

3. The head rotator assembly of claim 1 wherein the first actuator exerts a force against the first lever to flex the first lever, and wherein upon the flexing of the first lever, the first lever exerts a force against the head supporter to rotate the head supporter about a supporter pivot to move the head in the azimuth direction relative to the storage tape.

4. The head rotator assembly of claim 1 wherein the first actuator imparts an actuator bias force against the first lever in a first direction, and the first lever imparts a lever bias force against the head supporter in a second direction that is different than the first direction.

5. The head rotator assembly of claim 4 wherein the first direction is approximately perpendicular to the second direction.

6. The head rotator assembly of claim 1 further comprising a controller that receives a positioning signal from the head, the controller controlling movement of the supporter mover assembly based at least partially on the positioning signal.

7. The head rotator assembly of claim 1 wherein the first actuator includes a piezoelectric element.

8. The head rotator assembly of claim 1 wherein the supporter mover assembly further includes a second actuator that indirectly rotates the portion of the head supporter about the axis to move the head in the azimuth direction relative to the storage tape.

9. The head rotator assembly of claim 8 wherein the second actuator is on an opposite side of the head supporter from the first actuator.

10. The head rotator assembly of claim 1 wherein the supporter mover assembly further comprises a support plate, and wherein the head supporter is at least partially fixedly secured to the support plate.

11. A tape drive including a head and the head rotator assembly of claim 1 that supports the head.

12. A method for positioning a head of a tape drive relative to a storage tape that moves over the head, the method comprising the steps of:
   supporting the head with a head supporter that is coupled to the head; and
   indirectly rotating a portion of the head supporter about an axis with a first actuator to move the head in an azimuth direction relative to the storage tape as the storage tape moves over the head,
   wherein the step of indirectly rotating includes the steps of moving a first lever with the first actuator, and rotating the head supporter with the first lever to move the head in the azimuth direction relative to the storage tape as the storage tape moves over the head.

13. The method of claim 12 wherein the step of moving includes the step of imparting an actuator bias force with the first actuator against the first lever in a first direction, and wherein the step of rotating includes the step of imparting a lever bias force with the first lever against the head supporter in a second direction that is different than the first direction.

14. The method of claim 12 further comprising the steps of receiving a positioning signal from the head with a controller, and controlling movement of the first actuator with the controller based at least partially on the positioning signal.

15. The method of claim 12 further comprising the step of indirectly rotating a portion of the head supporter about an axis with a second actuator to move the head in an azimuth direction relative to the storage tape as the storage tape moves over the head.

16. The method of claim 12 futher comprising the step of fixedly securing at least a portion of the head supporter to a support plate.

17. A head rotator assembly for positioning a head of a tape drive relative to a storage that moves over the head, the head rotator assembly comprising:
- a head supporter that is coupled to and supports the head; and
- a supporter mover assembly including (i) a lever, (ii) a first actuator that indirectly rotates a portion of the head supporter about an axis to move the head in an azimuth direction relative to the storage tape as the storage tape moves over the head, and (iii) a second actuator that moves the lever to rotate the portion of the head supporter about the axis to move the head in the azimuth direction relative to the storage tape.

18. A method for positioning a head of a tape drive relative to a storage tape that moves over the head, the method comprising the steps of:
- supporting the head with a head supporter that is coupled to the head;
- indirectly rotating a portion of the head supporter about an axis with a first actuator to move the head in an azimuth direction relative to the storage tape as the storage tape moves over the head;
- indirectly rotating a portion of the head supporter about an axis with a second actuator to move the head in an azimuth direction relative to the storage tape as the storage tape moves over the head;
- wherein the step of indirectly rotating a portion of the head supporter about an axis with the second actuator includes the steps of moving a second lever with the second actuator, and rotating the portion of the head supporter with the second lever to move the head in an azimuth direction relative to the storage tape as the storage tape moves over the head.

* * * * *